United States Patent [19]

Dahlgren

[11] Patent Number: 4,991,922
[45] Date of Patent: Feb. 12, 1991

[54] OPTICAL FIBER COUPLER AND METHOD

[75] Inventor: Robert P. Dahlgren, Somerville, Mass.

[73] Assignee: The Charles Stark Draper Laboratory, Inc., Cambridge, Mass.

[21] Appl. No.: 237,778

[22] Filed: Aug. 29, 1988

[51] Int. Cl.$^5$ .................. G02B 6/26; G02B 6/42
[52] U.S. Cl. ................................. 350/96.15
[58] Field of Search ..................... 350/96.15

[56] References Cited

U.S. PATENT DOCUMENTS

| | | | |
|---|---|---|---|
| 4,021,097 | 5/1977 | McMahon | 350/96.15 |
| 4,054,366 | 10/1977 | Barnoski et al. | 350/96.15 |
| 4,307,933 | 12/1981 | Palmer et al. | 350/96.15 |
| 4,315,666 | 2/1982 | Hicks | 350/96.15 |
| 4,386,822 | 6/1983 | Bergh | 350/96.15 |
| 4,410,236 | 10/1983 | Schiffner | 350/96.15 |
| 4,431,260 | 2/1984 | Palmer | 350/96.15 |
| 4,475,790 | 10/1984 | Little | 350/96.15 |
| 4,493,528 | 1/1985 | Shaw et al. | 350/96.21 |
| 4,626,652 | 12/1986 | Bjork et al. | 219/121 LH |
| 4,630,884 | 12/1986 | Jubinski | 350/96.15 |
| 4,688,882 | 8/1987 | Failes | 350/96.15 |
| 4,707,201 | 11/1987 | Failes | 156/64 |
| 4,723,827 | 2/1988 | Shaw et al. | 350/96.15 |
| 4,795,226 | 1/1989 | Bennion et al. | 350/96.15 |

OTHER PUBLICATIONS

*A Study of Glass Surfaces in Optical Contact*, proceedings of the Royal Society, vol. 156 (1936), pp. 326–349, Lord Rayleigh.
On a Precision Method of Uniting Optical Glass–The Union of Glass in *Optical Contact by Heat Treatment*, vol. XII, pp. 305–313, Trans. Faraday Soc., R. G. Parker and A. J. Dalladay.
*Study of Mechanism of Contact Interaction of Plane Insulator Surfaces*, Sov. Phys. Solid State 20(I), Jan. 1978, pp. 97–100, V. M. Zolotarev, L. N. Kuraeva, S. S. Kachkin and Yu. V. Lisitsyn.
*Optical-Contact Bonding Strength of Glass Components*, Sov. J. Opt. Technol. 47(3), Mar. 1980, pp. 159–161, S. S. Kachkin and Yu. V. Lisitsyn.
*Ellipsometer Study of the Zone of Optical Contact of Glass Surfaces*, Sov. Tech. Phys. Lett. 4(12), Dec. 1978, pp. 609–610., M. I. Abaev, Yu. V. Lisitsyn and E. S. Putilin.
A Study of the Optical Contact of Transparent Dielectrics by the *Ellipsometry Method*, Sov. J. Opt. Technol., vol. 42, No. 8, Aug. 1975, A. S. Ahkmatov, I. P. Bolotich and R. D. Ovcharova.
*Polarization Holding in Coiled High–Birefringence Fibres*, Aug. 24, 1983, S. C. Rashleigh and M. J. Marrone.
*Thermal Properties of Highly Birefringent Optical Fibers and Preforms*, Applied Optics, vol. 22, No. 15, Aug. 1, 1983, pp. 2374–2379, A. Ourmazd, Malcolm P. Varnham, R. D. Birch and David N. Payne.
*Thermal Buckling of Dual–Coated Fiber*, AT&T Technical Journal, vol. 64, No. 7, Sep. 1985, pp. 1565–1584, T. A. Lenahan.
Single Mode Fiber Optic Components, R. A. Bergh, M. J. F. Digoneet, H. C. Lefevre, S. A. Newton and H. J. Shaw.

Primary Examiner—William L. Sikes
Assistant Examiner—Robert E. Wise
Attorney, Agent, or Firm—Lahive & Cockfield

[57] ABSTRACT

In an optical fiber coupling method and coupling assembly, an optical fiber is secured in a support block which is thermally matched to the fiber material. The fibers are coupled within a homogeneous glass medium, resulting in extreme resistance to ambient chemicals, radiation, temperature and forces. A region of the block is optically worked to form a coupling surface surrounding an exposed central portion of the fiber cladding. First and second such blocks are then positioned with their coupling surfaces aligned, and are placed in optical contact with their opposing counterparts. This produces an optical splice of the fibers within a boundary-free thermally matched medium. The optically-contacted assembly, once aligned, is substantially self-securing, and, due to its homogeneity, does not introduce stresses to the fiber as the temperature of the assembly varies. Preferred forms of fiber mounting and methods of enhancing the formation and quality of optical contact are disclosed.

17 Claims, 4 Drawing Sheets

OPTICAL FIBER COUPLER AND METHOD

BACKGROUND OF THE INVENTION

The present invention relates to an optical fiber coupler.

In recent years a number of instruments have been developed which operate on measurements derived from coherent light which has been directed along a sensing path. Examples of such instruments are coherent communications devices, and also Mach-Zender, Sagnac or resonator interferometers for the sensing of rotation, magnetic fields, acoustic fields and other phenomena. The sensing path in such an instrument is provided by an optical fiber which is preferably of a lenght sufficient to provide adequate sensitivity, and which possesses optical properties which preserve the characteristics of the light being measured. The fibers may be polarization preserving.

Operation of the aforesaid instruments entails the dividing or mixing of optical signals along differently-directed paths, and thus requires a physical structure such as a fiber coupler which can couple a precise portion of the light from a segment of one fiber into a segment of another fiber. In applications sensitive to polarization, it is further required, that the coupler preserve the state of polarization of the optical energy which it couples from the first to the second fiber. This constraint may apply to devices having polarizing (PZ), polarization maintaining (PM) or single mode (SM) fibers.

In the prior art, one class of methods of coupling two fibers involves bonding each fiber in a shallow groove formed in a block, polishing each block to expose the fiber cladding close to the central fiber core, and then juxtaposing the two blocks, possibly also using an optical coupling medium, so that the evanescent wave energy from a finite segment of the exposed cladding of one fiber is coupled into a segment of the exposed cladding of the next fiber along an interval called the interaction length. The ratio of coupled energy depends upon the proximity to the core of the exposed cladding, the interaction length, and other factors of the construction.

FIGS. 1A and 1B illustrate such prior art constructions. In the embodiment shown in FIG. 1A, a fiber 10, with its protective jacket 13 removed from a region thereof, is embedded in an arcuate groove 12 formed in a block 14 so that it rises tangent to the surface 16 at the center of the block. The block surface 16 is curved so the fiber defines an extreme position, or the block is chosen to be softer than the fiber so that after polishing the fiber protrudes from the block surface.

As shown in FIG. 1A, two such blocks 14a, 14b are opposed to each other with their fibers placed in close proximity. Any gap between the fibers is filled by an optical index-matching medium 18 which may, for example, be an oil or an ultraviolet-curable adhesive of suitable refractive index. Such a structure allows the evanescent field regions of the two fibers to overlap, and coupling to occur with low loss. This construction has a disadvantage that light may be absorbed or scattered by the coupling medium 18, and, further, that temperature variations and aging effects can change both the dimensions and index of the medium 18, resulting in changes of the coupling ratio and increased loss. When the coupling medium is at all absorptive, another drawback of such an evanescent were coupler is an inherent asymmetric mode loss. For a resonant ring instrument, such as a Mach-Zender interferometer, asymmetric mode loss results in an asymmetric resonance dip, seriously complicating the instrument's performance.

Another prior art coupler construction is shown in FIG. 1B. This construction is similar to that of FIG. 1A, but differs in that the protruding cladding of each fiber is polished sufficiently flat so that the two opposing fibers may be placed in direct optical contact along their interaction length. For this construction, as described in U.S. Pat. No. 4,688,882 of Michael Failes, an adhesive 20 is used to secure and support the opposed blocks once their fibers have been placed in optical contact. The formation of a direct "optical contact" requires a much greater optical flatness, and a much lower level of surface roughness, than that required for the coupling of FIG. 1A, and also requires scrupulously clean fabrication conditions. However, the absence of an intermediate dissimilar medium in this construction results in improved stability of the coupling ratio and provides decreased loss.

Applicant believes, however, that this second construction is prone to several adverse eventualities. First, because the blocks themselves are primarily secured on opposing sides of a dissimilar medium, namely the adhesive 20, thermal gradients and thermal shock may be expected across the interface which may disrupt the fiber-to-fiber bond, especially at low temperatures. Secondly, the optical contact region may build up localized stresses of a type which can alter the refractive index and cause mode loss. The adhesive 20 provides a relatively low level of resistance to certain environment conditions (e.g., radiation) and may result in excessive outgassing. Finally, thermally induced stresses due to the differing materials of the fibers, the blocks and the adhesive, respectively, may compound some of the above effects.

OBJECTS AND SUMMARY OF THE INVENTION

Accordingly, it is an object of the invention to provide a method and a coupler for coupling optical fibers having good coupling characteristics and which overcomes one or more of the aforesaid problems.

These and other desirable features are obtained in an optical fiber coupling method and coupler assembly wherein each optical fiber which is to be coupled is first embedded in a coupling block which is substantially thermally matched to the fiber material, and wherein both the fiber and the block are then optically lapped and placed in optical contact with their opposing counterparts to produce an effective fusion of the fibers within a boundary-free thermally matched medium. The optically-contacted assembly, once aligned, is substantially self-securing, and, due to its homogeneity, does not introduce stresses to the fiber as the temperature of the assembly varies. Moreover, since the fiber coupling region is within a unitary glass block, the coupler is unaffected by outgassing, chemical reagents, radiation and other environmental challanges.

When a fiber is polarizing, or polarization-maintaining, the coupling regions of the fibers may be oriented and polished so that the corresponding axes of birefringence of each fiber are parallel to those of the other fiber in the assembled structure.

BRIEF DESCRIPTION OF THE DRAWINGS

These and other features of the invention will be understood from the following detailed description, with reference to the drawings, wherein.

DETAILED DESCRIPTION OF ILLUSTRATED EMBODIMENT

Figure 1A:
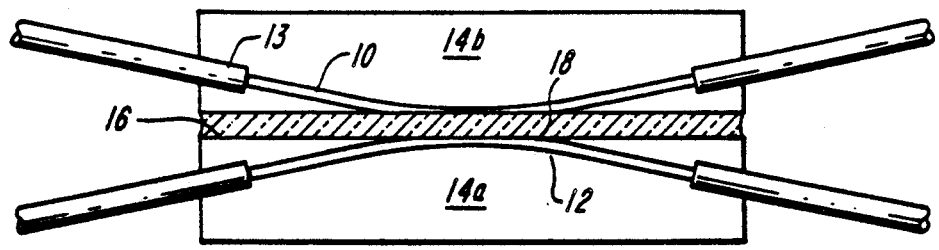
FIGS. 1A and 1B are side views illustrating prior art optical fiber couplers.
Figure 1B:
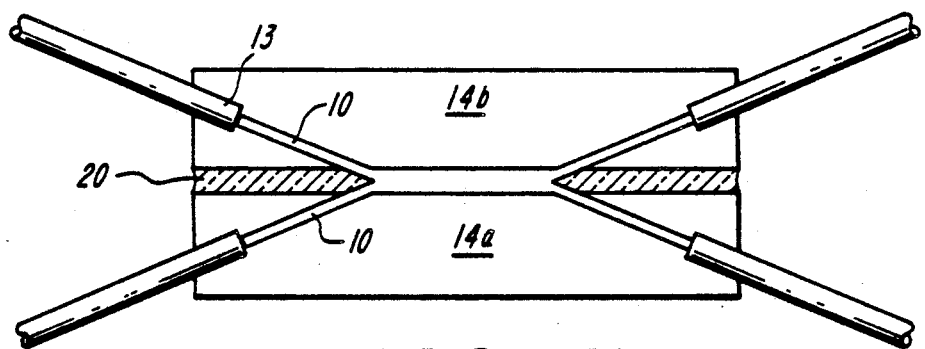
Figure 2:
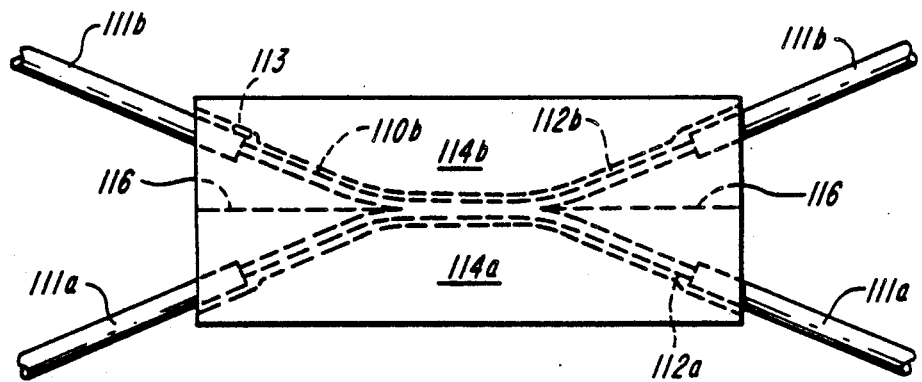
FIG. 2 is a side view of a coupler according to the present invention.

FIG. 2 is a schematic side view of an optical fiber coupler 114 according to the present invention, which is illustrated from a perspective corresponding to that of FIGS. 1A and 1B in order to more clearly identify the differences in construction from those of the prior art.

Fiber coupler 114 includes a first coupling block 114a having a first segment of optical fiber 111a attached thereto, and a second coupling block 114b having a second segment of optical fiber 114b. The two segments 111a, 111b may be segments of the same fiber, or of different fibers. Each segment has its protective jacket 113 removed from a central region thereof and is bonded in a supporting and orienting groove 112a, 112b formed in the corresponding coupling block.

The grooves 112a, 112b are preferably arcuate grooves which are similar to grooves 12 of the prior art coupling blocks shown in FIGS. 1A, 1B in that they are formed in a large-radius arc which rises tangent to, or only slightly offset from a tangent to, the surface of the coupling block to position the fiber at a designated coupling region. These grooves differ, however, in that they are formed, or the blocks are subsequently worked, such that the groove surfaces in a flat face of the block and has a depth at its shallowest point which is not significantly greater than one-half a fiber diameter. In addition, the interfaces 116 between blocks 114a, 114b and between the opposing fibers are each a common homogeneous region formed by placing opposed surfaces of the blocks, and the opposed exposed regions of the fibers, respectively, in total optical contact. The assembly is thereby held together by molecular bonding without requiring the use of an adhesive or an index matching medium, although, as discussed below, each fiber is cemented in its groove. Certain other details of fabrication which are discussed further below, offer improvements over the prior art constructions.

Figure 3:
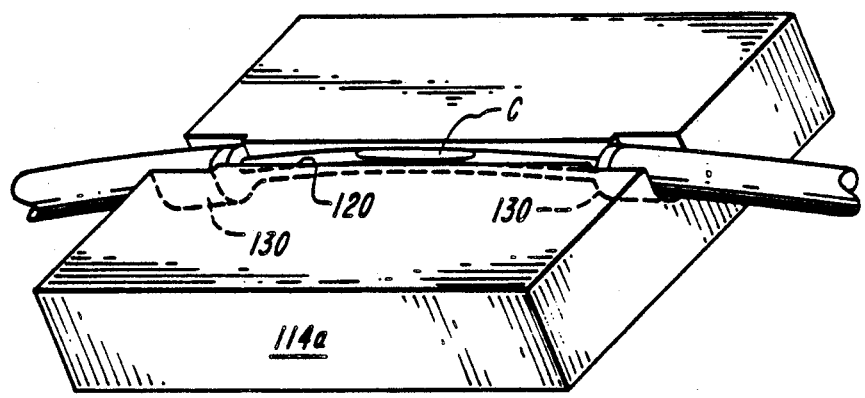
FIG. 3 is a top perspective view of one coupling block of the coupler shown in FIG. 2, illustrating aspects of the fabrication of the coupler.

Details of the fabrication of such a coupling will be better understood from the following discussion of the method of making one block 114, illustrated in FIG. 3. Block 114 constitutes one-half of the coupler, the other block being substantially identical. Block 114 is made from a flat fused silica rectangular blank, having dimensions approximately 0.25×0.25×1.00 inches. The block material is preferably a bulk synthetic silica glass having a nominal coefficient of thermal expansion of 0.52 ppm/°C., which is selected to match as closely as possible the coefficient of the intended fiber. A suitable glass is available from Nippon Silica Glass U.S.A., Inc. of Somerville, N.J. Ideally the glass employed for the coupler blocks is the same glass employed by the fiber manufacturer for the fiber preform.

Figure 4:
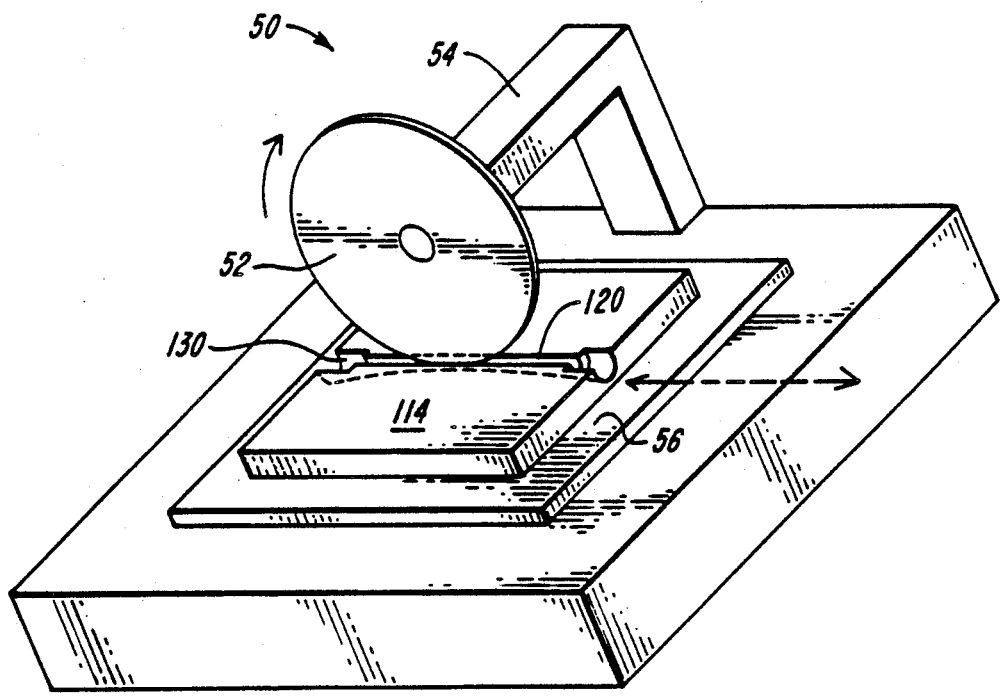
FIG. 4 is a schematic view of a jig for forming support blocks.

FIG. 4 illustrates schematically a jig 50 which was used to fabricate portions of the coupler. For purposes of this disclosure, it is only necessary to note that the salient features of jig 50 include a movable positioning table 56 on which the block is mounted, and a rotary metal foil blade 52 suspended over the table by an arm 54. A thin blade is first used to cut a groove having a width slightly larger than the fiber cladding, and a second, thicker, blade is used to cut the larger recesser for receiving the jacketed fiber at the ends of the block. The fiber-receiving groove is preferably then polished by drawing a wire charged with suitable polishing compound through the groove to remove surface roughness.

As shown in FIG. 3, a groove consisting of a fiber-receiving portion 120 and jacket-receiving recesses 130 was ground into a surface of the blank or block 114 along an arc having a radius of approximately thirty inches, as measured from a center point lying on the opposite side of the block, with a generally U-shaped groove cross-section, and a groove width of approximately 0.125 mm. At the ends of groove 120 the larger diameter recesses 130 were formed in a separate grinding operation using a 0.5 mm abrasive blade to cut cavities of a suitable width for receiving the fiber jacket, which had a diameter of approximately 400 microns. The groove 120 was then polished by drawing a moving wire, charged with a calcined alumina polish through the groove to achieve a polished surface having an average surface roughness $R_a$ of less than one micron.

Continuing with a description of the fabrication of the coupling block of FIG. 3, after forming and polishing the groove 120, a fiber is mounted in the groove as follows.

The jacket is mechanically removed from a central portion of a single mode fiber to expose the bare cladding, illustratively, 125 microns in diameter. An adhesive cement 88 is then applied for securing the fiber to the groove, and the stripped fiber is then placed in the groove. During setting of the cement, the fiber is maintained under slight tension to urge it toward the groove floor. In addition, when working with a PM or PZ fiber, its angular orientation about the fiber axis is monitored and set to align its internal polarization axes with respect to the surface plane of the mounting block. More specifically, for a fiber of the polarizing variety, its principal axes are preferably oriented parallel or perpendicular with respect to the block surface prior to cementing, so that when a segment of the exposed cladding is removed to form a coupling face, the birefringent principal axis in the remaining fiber will align with that of its opposing counterpart. This assures that light of the desired state of polarization will couple into an opposing fiber with minimal cross coupling in the orthogonal state of polarization, when the coupler is assembled. Such construction minimizes polarization cross coupling in the assembled coupler. This characteristic improves performance of an interferometer or other system utilizing the coupler.

Figure 5A:
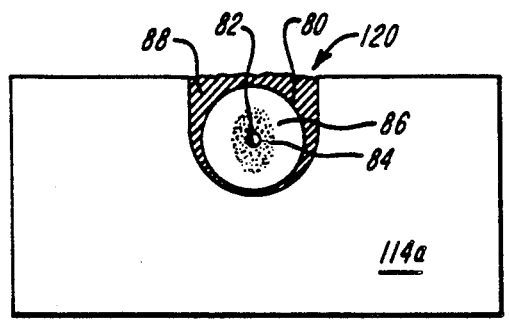
FIG. 5A-5F illustrate fiber alignment of representative fibers.
Figure 5B:
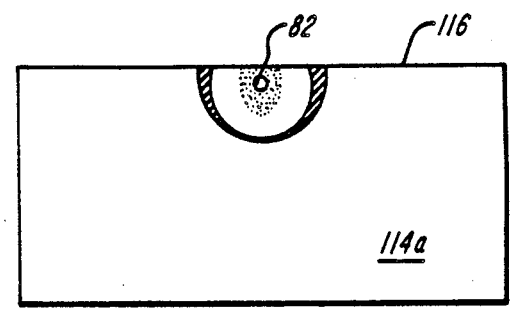
Figure 5C:
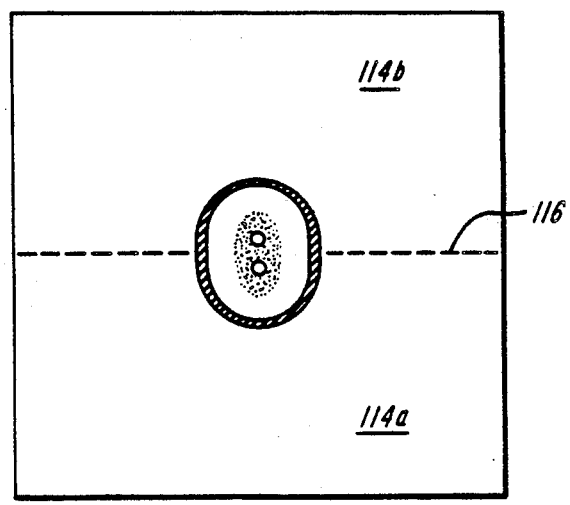
Figure 5D:
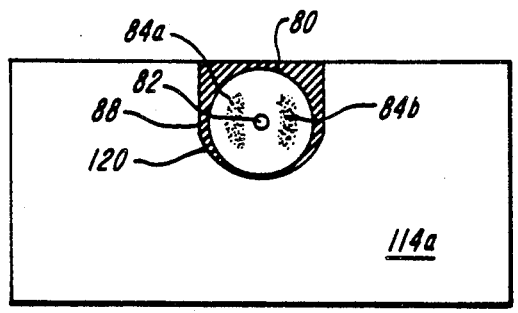
Figure 5E:
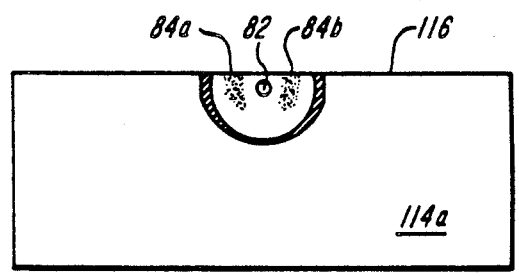
Figure 5F:
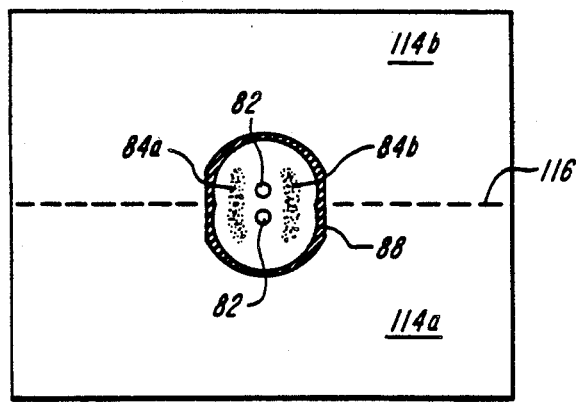

FIGS. 5A-5F illustrate a cross sectional view taken at a point along the interaction path, of an elliptical and a PANDA-type polarizing fiber 80 when cemented in the block (FIGS. 5A, 5D), after lapping (FIGS. 5B, 5E) and after assembly of two blocks to form a completed coupler (FIGS. 5C, 5F). These Figures will be discussed further below to illustrate details of scale and orientation.

First, however, several other details of construction merit particular mention. While it is believed that conventional optical cements may be employed for mounting the fiber in the groove as described, preferably an adhesive is used which, when set, forms a glass or other material having the same thermal coefficient of expansion as the block. Preferably, the bonding material also enjoys the same optical polishing hardness as the fiber and surrounding block. This may be achieved with a sol-gel adhesive preparation consisting of a dissolved metallic oxide which forms a colloid-like oligomer and hardens to a glass-like material. Silica cements of this type are available from Petrarch Systems, Inc. of Bristol, Pa., and may be compounded to achieve a desired thermal coefficient of expansion matching a given block 114.

Continuing with a description of the illustrated embodiment, after the fiber has been cemented in the groove, the surface of the block is lapped, removing the fiber cladding in a central region of the block to within a few microns of the core. The lapping is performed slowly and carefully to minimize mechanical trauma and heat generation, so as to not disturb the fiber birefringence or cause subsurface damage. Once the surface is lapped to within ten to twenty microns of the core, it is polished with a conventional polish, e.g., with calcined alumina, or with a mildly reactive polish such as that sold under the trade name "Syton" by the Logitech company of Nashua, N.H., to achieve an optical flatness of approximately $\lambda/20$ and a surface roughness of under approximately one micron. As the polishing proceeds, an oil drop test is used to monitor the depth of removed fiber cladding, as described, for example, in M. Digonnet et al., Measurement of the Core Proximity in Polished Fiber Substrates and Couplers, *Optics Letters*, Vol. 10, No. 9, (Sept. 1985).

Two such blocks 114a, 114b are prepared in this manner and scrupulously cleaned. After cleaning, the two blocks 114a, 114b are first placed in a special jig to align the surfaces within a few microns of each other, so that evanescent wave energy of one fiber passes into the other fiber. Light is then directed into one fiber and the output of the other fiber is monitored to determine the degree of coupling. While monitoring, one block 114b is moved in a plane parallel to the other block, until the polished regions of both fiber claddings are brought precisely into registry, with the desired coupling ratio. The two blocks are then urged together so that a total optical contact is achieved between the contacting fibers, and is also achieved between the surrounding polished surface regions of the two support blocks.

Preferably, the entire face of each block optically contacts the other block, to achieve the most permanent and strain-free contact. This creates an optical splice of the two fiber claddings through which evanescent wave energy of light traveling in one fiber core is coupled into the adjacent fiber. Since optical contact is achieved over the surface of the substrate blocks 114 surrounding the fiber, stress is substantially eliminated at the joining surface, and the strength of the optical contact bond maintains the two blocks joined together. The matching of thermal coefficients assures that the coupling parameters of the structure do not vary with temperature. Furthermore, the optically-contacted assembly provides a hermetic environment for the fibers and cores mounted therein, offering enhanced protection from environmental chemicals and radiation.

In a contemplated preferred construction, additional steps are performed in assembling the two blocks to improve coupler characteristics, as follows.

One such step is to place each block 114a, 114b, prior to assembly, in a highly evacuated chamber which is heated, or cycled through a heat cycle, above approximately 200° C. for several hours. This outgasses material from the glass surface which might otherwise leach and form surface deposits impairing the optical contact. The outgassing is expected to eliminate possible sources of hydroxide ions which could degrade the fiber characteristics with age.

Another step calculated to enhance the optical bonding of the two blocks is to allow the completed coupler to "age" for a certain period under conditions which enhance bond formation across the contacted surfaces. For example, a static charge may be placed across the two blocks 114a, 114b, or the blocks may be heated to an elevated temperature below the glass softening temperature. Either of these conditions enhances molecular migration, and may make the optically contacted bond irreversible, while leaving the essential optical properties of the fibers unimpaired.

Returning now to FIGS. 5A-5C, there is shown a block and coupler assembly fabricated with a single made elliptical fiber 80.

This fiber is chosen to illustrate preferred fabrication details for a single-mode fiber coupler because of its clearly visible structure. As shown in FIG. 5A, the fiber 80 includes a light-conducting core 82 centered within the cladding, and an elliptical region of heterogeneous material 84 which induces stresses for establishing birefringence in the vicinity of the core. As in any optical fiber, cladding medium 86 including stress-forming region 84 is a glass of an index different from that of core 82, for assuring that light propagates without leakage from the core. A cement 88 secures the fiber in groove 120, with the bottom of the fiber, as shown, contacting the floor of the groove. For purposes of illustration, lateral clearance in the groove is exaggerated. Core 82 lies below the upper surface of block 114a by an amount which, after polishing as shown below, is preferably at least two or three core diameters.

As shown in FIG. 5B, block 114a has been lapped so that its upper surface 116 and corresponding region of exposed cladding are optically flat and the desired level of evanescent energy, as determined by the index oil test above, exits from the fiber. This level will generally correspond to a surface 116 lying at a level between a few microns and a few core diameters above the core 82.

As shown in FIG. 5C, two such blocks are placed in total optical contact such that the surfaces 116 of the fibers and blocks join at a molecular level. Because the optical contact bond is formed by molecular forces drawing the opposed surface into contact to form a homogeneous region, rather than by an external pressure or a localized pressure, an extremely stable low-strain union is achieved. Thus, the oriented stress lines of each polished fiber are not disturbed, and the preferential polarization is preserved when light from one fiber couples into the other fiber.

FIGS. 5D-5F show views of a coupler block using a PANDA-type fiber corresponding to the stages shown in FIGS. 5A-5C. This type of fiber is fabricated with a pair of localized bands of heterogeneous material 84a, 84b having a different coefficient of thermal expansion from the surrounding material to cause a directed stress in the vicinity of the core. The localized nature of these heterogeneous bands makes the relative orientations of block surface and fiber features clearly visible. The reader will readily determine from these examples the required orientation and depth of lapping for other common fiber types, such as bow-tie fibers.

It will be appreciated that the described construction, unlike other methods of intimately joining optical fibers, does not rely on adhesives, thermal fusing, or on a massive coupling structure urging small fiber surfaces into union. By eliminating such factors, as well as eliminating thermal effects otherwise caused by dissimilar materials, any layer of differing refractive index which might arise from the elasto-optic effect is substantially eliminated. The coupler so produced is free of organic contaminants, and is environmentally hardy. As such it is expected to maintain its coupling characteristics over a wide range of environment conditions, including extremes of temperature, radiation, g-forces and chemical exposure.

It will be appreciated that the invention has been described herein with reference to a presently preferred embodiment, which differs both as to is overall structure, and as to numerous details, of manufacture and assembly from couplers of the prior art. Such description has been by way of clarifying illustration, to enable a person skilled in the art to practice the best mode of invention presently contemplated by the applicant, but is not intended to be in limitation of the invention. The illustrated embodiment being thus disclosed, other forms and variations within the general scope of applicant's discovery will occur to those skilled in the art, and all such forms and variations are part of the invention, as defined by the claims appended hereto.

What is claimed is:

1. A coupler for optically joining first and second optical fibers such that a portion of light in the first fiber is coherently coupled to the second fiber, such coupler comprising
   a first support block fixedly carrying the first fiber such that said first fiber surfaces along a first path at a first surface of said first support block,
   a second support block fixedly carrying the second fiber such that said second fiber surfaces along a second path at a second surface of said second support block,
   each said support block being formed of material having a thermal coefficient of expansion substantially matched to material of the first and second fiber, and each said first and second surface being optically worked to expose a central region of fiber cladding while forming a corresponding first or second optically flat surface comprised of a fiber and a surrounding support block surface region,
   said first and second optically flat surfaces being secured together in alignment by optical contact bonding of corresponding fiber and support block surface regions at said first and second optically flat surfaces.

2. A coupler according to claim 1, wherein said support blocks are formed of the same bulk material as said fibers.

3. A coupler according to claim 2, wherein said fibers are each bonded to a fiber-supporting groove formed in a respective one of said support blocks and having a depth at said coupling region of less than one fiber diameter.

4. A coupler according to claim 1 wherein each said fiber is bonded to a support groove in a said coupling block with a compliant adhesive, such that when said coupling surface is lapped, an exposed portion of the fiber cladding is lapped to a height at or above said surface.

5. A coupler according to claim 1, wherein said coupling surfaces are flat to within approximately $\lambda/20$.

6. A coupler according to claim 1, wherein a said fiber is supported in contact with the floor of a groove formed in a said support block, and wherein said floor is polished to remove roughness.

7. A coupler according to claim 1, wherein each said fiber is secured in a groove in a support block with a silica-based bonding material.

8. A coupler according to claim 7, wherein said support blocks are formed of material which is substantially matched to said fibers for both thermal coefficient of expansion and for optical polishing hardness.

9. A coupler according to claim 8, wherein said support blocks are formed of a synthetic silica glass having a thermal coefficient of expansion of approximately 52 ppm/° C.

10. A method of coupling two optical fibers along a portion of their lengths, such method comprising the steps of
    securing each fiber in a support block formed of a material having a thermal coefficient matched to the material of the fiber,
    optically working each support block to form an optically smooth coupling surface region on each block wherein the fiber extends to the surface on each block and its cladding is removed to a level of said surface within a few microns of the core so as to define a fiber coupling path on each coupling surface region, and
    urging said support block together to form an optical contact bond between respective blocks and between respective fibers which secures the blocks together along said coupling surface regions such that the coupling paths of respective fibers overlap thereby forming a stress free temperature stable optical coupling between said two fibers.

11. A method of coupling two optical fibers so as to form a coupling having a defined coupling ratio, such method comprising the steps of
    securing each fiber in contact with a respective support block formed of a material having substantially the same thermal coefficient of expansion as the fiber,
    working each support block to form an optically flat coupling surface thereon spaced about and substantially coplanar with an optically flat exposed portion of the fiber cladding,
    aligning the optically flat exposed portions of the two fibers to achieve a defined optical coupling ratio, and
    securing said coupling surfaces and exposed claddings of said two optical fibers together by total optical contact to form an optically contact-bonded splice of said fibers within a boundary-free medium, thereby substantially eliminating thermal stress and achieving a temperature-stable coupling ratio.

12. The method of claim 11, further comprising the steps of heating and outgassing the worked support blocks prior to aligning and placing the blocks in optical contact.

13. The method of claim 11, further comprising the step of aging the coupler under conditions of charge or temperature effective to enhance molecular migration at the optical contact.

14. An optical fiber coupler wherein a first and a second fiber are placed in optical communication within a supporting structure, comprised of plural separate fiber holding and aligning blocks, each having an optically flat surface, the optically flat surfaces being optically contact bonded to each other so that the plural separate blocks form a unitary boundary-free medium surrounding a junction of said first and second fiber.

15. A coupler according to claim 14, wherein a said block is formed of an inorganic medium having a thermal coefficient of expansion approximating that of a said fiber.

16. A coupler according to claim 15, wherein said fibers are optically contact bonded along a surface effective to couple evanescent wave energy between said first and said second fibers.

17. A coupler according to claim 14, wherein said fibers are birefringent and the birefringence axes of said fibers are parallel in the region of optical contact bonding.

* * * * *